United States Patent Office 3,489,782
Patented Jan. 13, 1970

3,489,782
PROCESS FOR PREPARING ORGANOSILOXANES
Pierre A. Pruvost, Lyon, Michel L. Bourbon, Bron, and Michel Vialle, Ecully, France, assignors to Societe Industrielle des Silicones, Paris, France
No Drawing. Continuation of application Ser. No. 558,614, June 20, 1966. This application Feb. 26, 1969, Ser. No. 804,366
Claims priority, application France, June 29, 1965, 22,736
Int. Cl. C08g 47/02; C07f 7/08
U.S. Cl. 260—448.2
21 Claims

ABSTRACT OF THE DISCLOSURE

A process for hydrolyzing silanes to provide useful products is disclosed. The process includes dissolving a silane containing a hydrolylable substituent in a polar organic solvent, hydrolyzing the silane in a single homogeneous liquid phase by contacting with a hydrolyzing agent, adding to the single homogeneous liquid phase a silane or hydrolyzed product thereof and separating a polycondensate formed from the remaining hydrolyzing agent. The polycondensates are useful intermediates which react witho ther silicones and organic polymers and find use in making electrical insulation, laminating compounds and molding compounds.

---

This application is a continuation of our application Ser. No. 558,614, filed June 20, 1966, now abandoned.

The present invention relates to a process for preparing polycondensates from silanes having hydrolyzable substituents.

It is known that the tri- and tetrachlorosilanes are formed, for example, from the reaction of silicon with alkyl or aryl chlorides at the same time as the mono- and dichlorosilanes. Depending on the operating conditions and the catalysts employed, the proportions of tri- and tetrachlorosilanes will vary and may go as high as 25% by weight of the total silanes formed. However, the use of these tri- and tetrachlorosilanes is very much diminished because their hydrolysis, according to the conventional methods carried out in a heterogeneous medium at the interface of two phases, is violent, irregular and proceeds with complex reactions which provoke localized elevations of temperature which leads to unstable products or to gels without any worthwhile chemical or physical properties. The cohydrolysis of the tri- and tetrachlorosilanes with mono- or dichlorosilanes has been suggested to make the tri- and tetrachlorosilanes more useful, but until now only small proportions of tri- and tetrachlorosilanes have been used in the cohydrolyzates. As the proportion of tri- and tetrachlorosilane is increased in the cohydrolyzate, the easier the composition forms gels and the more difficult it is to eliminate the gel formation.

Conversion of the tri- and tetrachlorosilanes into silanes having hydrolyzable substituents other than chlorine is also possible, but this conversion reqires a supplementary operation and generally the presence of a hydrochloric acid acceptor, such as pyridine or ammonia, is necessary. Moreover, classical hydrolysis of such substituted silanes likewise, often lead to gels without any worthwhile chemical or physical properties.

It is also known that the conversion of tri- and tetrachlorosilanes to dichlorosilanes is possible, but this constitutes a supplementary operation which is onerous to realize.

An object of this invention is a process which provides a means for preparing new industrial products which are polycondensates obtained by hydrolyzing silanes having at least three hydrolyzable substituents.

Another object of this invention is to provide a process of hydroyzing silanes having one or two hydrolyzable substituents.

The process which is the object of this invention avoids the various serious inconveniences discussed above and permits obtaining directly non-gelled compounds, econnomically, rapidly and simply, composed of or containing silane polycondensates wherein the starting silanes have at least three hydrolyzable substituents. The polycondensates of this invention are obtained by starting from one or more silanes having at least three hydrolyzables substituents, alone or in a mixture with one or more silanes having at least three hydrolyzable substituents. The silane polycondensates exhibit numerous and various properties which render them suitable for a number of industrial applications.

It has been found by elementary experimental analysis that the polycondensates are of the following average statistical composition based on one atom of silicon:

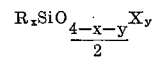

in which $x$ has an average value from 0 to 2.5 inclusive and $y$ has an average value from 0 to 1.5 inclusive; however, $x$ and $y$ must not be 0 simultaneously in the same compound.

This average statistical unit formula reflects, in a rather unrealistic fashion, the complexity of the structure of the polycondensates of the present invention. It gives only the results of the macromolecules analysis, whose actual structure is very difficult to establish. In these polycondensates the number of silicon atoms in the macromolecule can vary widely and can attain values of the order of 5000.

In the average statistical composition R can be a monovalent radical such as a hydrogen atom or an organic radical bonded to the silicon atom by a silicon-carbon bond such as any monovalent hydrocarbon radical, such as an alkyl radical such as methyl, ethyl, isopropyl, tertiary butyl, hexyl, octyl, 2-ethylhexyl, 1-isobutyl-3,5-dimethylhexyl, dodecyl, octadecyl and myricyl; an alkenyl radical such as vinyl, allyl, decenyl, hexadienyl and octadecenyl; a cycloalkyl radical such as cyclopentyl, cyclohexyl and methylcyclohexyl; a cycloalkenyl radical such as cyclopentenyl, cyclohexenyl, cyclo-2,4-hexadienyl and cyclo-1,4-pentadienyl; an aryl radical such as phenyl, naphthyl and xenyl; an aralkyl radical such as benzyl, phenylethyl and xylyl; an alkaryl radical such as tolyl, ethylphenyl, dimethylphenyl, diethylphenyl, methylnaphthyl, propylxenyl. The monovalent hydrocarbon radicals can be substituted by groups such as halogenated, nitrated, sulfonated, sulfoxylated, carboxylated and thus monovalent substituted hydrocarbon radicals are also represented by R such as chloromethyl, 3,3,3-trifluoropropyl, 3,3,4,4,5,5,5-heptafluoropentyl, α,β,β-trifluoro-α-chlorocyclobutyl, 3,4 - dibromocyclohexyl, 2 - iodocyclopentene-3-yl, perchlorophenyl, β-nitroethyl, γ-nitropropyl, nitrophenyl, (methylsulfonyl)ethyl, 1 - (propylsulfonyl) butyl, meta(methylsulfo)phenyl, β-carboxyethyl, γ-carboxypropyl, β-(chlorocarboxy)ethyl, ethylcarboxyethyl and acetoxyethyl. R also represents a cyanoalkyl radical such as β-cyanoethyl, β-cyanopropyl, γ-cyanopropyl, ω-cyanobutyl, α-cyanobutyl, and ω-cyanooctadecenyl.

The silicon atoms in a single polycondensate can have R substituents which are alike or different from one silicon atom to the other. Moreover, the R substituents of a single silicon atom can be alike or different.

In the average statistical composition, X represents a monovalent reactive radical such as a hydroxyl radical; a halogen atom such as chlorine, bromine, iodine and fluorine; an alkoxy radical such as methoxy, ethoxy, propoxy, butoxy, 4-one-2-methyl-2-pentoxy; an alkenyloxy radical such as allyloxy, 2-butenyloxy and pentenyloxy; a cycloalkoxy radical such as cyclobutoxy, cyclohexoxy and cyclopentoxy; a cycloalkenyloxy radical such as cyclobutenyloxy and cyclopentenyloxy; an aryloxy radical such as phenoxy, naphthoxy and xenoxy; an aralkoxy radical such as phenylethoxy and phenylpropoxy; an alkaryloxy radical such as methylphenoxy and dimethylphenoxy. The various organic radicals as shown above for X can also be substituted, for example, by halogen atoms, hydroxyl, radicals, ethers, esters, nitriles, acid radicals. The substituted organic radicals can be, for example, 2-chloropropoxy, 3,3,3 - trifluoropropoxy, 2 - (ethoxy)ethoxy, 2-(ethoxy)propoxy, 3-(cyano)propoxy, and 3-(carboxy) propoxy. X can also represent any acid hydrolyzable radicals such as acetoxy, methylacetoxy, 2-ethylhexylacetoxy, sulfuric, organosulfuric, organosulfonic, as well as any basic hydrolyzable group such as amino, dimethylamino, ethylpropylamino, and hydrazino.

The silicon atoms in a single polycondensate can carry X substituents which are alike or different from one silicon atom to the other. Moreover, the X substituents on the same silicon atom can be the same or different.

The fact that R and X can be different from one silicon atom to another of a single macromolecule in a given polycondensate, signifies the presence of copolycondensates, that is, polycondensation products of at least two monomers.

The process of the present invention relates to the preparation of organosiloxanes comprising (A) dissolving in a polar organic solvent at least one silane having at least one hydrolyzable substituent bonded to the silicon atom and any remaining substituents being selected from the group consisting of hydrogen atoms and monovalent organic substituents bonded to the silicon atom through silicon-carbon bonds, (B) hydrolyzing by contacting the silane with a hydrolyzing agent in a single homogeneous liquid phase, thereafter, (C) adding to the single homogeneous liquid phase and maintaining same, at least one silicon compound selected from the group consisting of a silane as defined above and a hydrolyzed product of at least one silane as defined above, (D) maintaining a single homogeneous liquid phase during (A) and (B), and (E) separating a polycondensate formed in (C) from at least any remaining hydrolyzing agent.

For the purpose of this invention the term hydrolyzing agent will mean, composed of or containing water such as water or water in an organic solvent or a product capable of freeing water, for example, hydrogen peroxide, an alcohol or a base reacted with an acid.

The initial compound to be subjected to hydrolysis by the process of the present invention can be a silane having from 1 to 4 inclusive hydrolyzable substituents. Each of the hydrolyzable substituents can be monovalent radicals such as halogen atoms, alkoxy radicals, alkenyloxy radicals, cycloalkoxy radicals, cycloalkenyloxy radicals, aryloxy radicals, aralkoxy radicals, alkaryloxy radicals, the foregoing organic radicals substituted with halogen atoms, hydroxyls, ethers, esters, nitriles and acid radicals, any acid hydrolyzable radical and any basic hydrolyzable radical. Examples of each are shown above for X. Any of the hydrolyzable substituents on a single silicon atom can be alike or different.

When the number of hydrolyzable substituents is less than 4, the complement of 4 represents the number of non-hydrolyzable substituents which are described above for R. Any of the non-hydrolyzable substituents of a single silicon atom can be the same or different.

Among the substituted silanes corresponding to this definition, examples are: trichlorosilane, tetrachlorosilane, trimethylchlorosilane, methyltrichlorosilane, vinyltrichlorosilane, phenyltrichlorosilane, the distillation residue of chlorosilane synthesis formed from mixtures of various chlorosilanes and often rich in hydrolyzable chlorine, tertiary butyltrichlorosilane,
2-ethylhexyltribromosilane,
octadecyltrichlorosilane,
decenyltriiodosilane,
cyclopentenyldiethoxychlorosilane,
phenyldiethoxychlorosilane,
benzyltrichlorosilane,
3,3,3-trifluoropropyltrichlorosilane,
3,3,4,4,5,5,5-heptafluoropentyltriiodosilane,
$\beta$-cyanopropyltrichlorosilane,
triiodosilane,
methyltriacetoxysilane,
bis(acetoxyethyl)phenylchlorosilane,
bis(chlorocarboxyethyl)benzylchlorosilane,
methylmonoacetoxydichlorosilane,
methyldichlorosilane,
dimethyldichlorosilane,
diethyldichlorosilane,
methylpropyldichlorosilane,
methylvinyldichlorosilane,
phenylmethyldichlorosilane,
tertiarybutylethyldichlorosilane,
2-ethylhexylmethyldibromosilane,
cyclopentenylethyldiethoxysilane,
3,3,3-trifluoropropylmethyldichlorosilane,
dimethyldiacetoxysilane,
phenylmethyldiacetoxysilane,
phenyldichlorosilane,
trimethylaminosilane,
dimethylethylchlorosilane,
dimethylvinylchlorosilane,
dimethylphenylchlorosilane,
2-ethylhexyldibromosilane,
trimethylacetoxysilane,
dimethylphenylacetoxysilane,
dimethylbenzylchlorosilane,
phenylmethylvinylchlorosilane,
dimethylmonochlorosilane,
phenylmethylmonochlorosilane,
hexadienyltrifluorosilane,
naphthyltrimethoxysilane,
tolyltriallyloxysilane,
$\gamma$-nitropropyltributoxysilane,
(methylsufonlyl)ethyltri(2-butenyloxy)silane,
1-(propylsulfinyl)butyltricyclohexoxysilane,
meta-(methylsulfo)phenyltricyclopentenyloxysilane,
$\omega$-cyanooctadecenyltriphenoxysilane,
isopropyltriphenylpropoxysilane,
hexylmethyl-bis(dimethylphenonxy)silane,
dioctyldi(2-chloropropoxy)silane,
1-isobutyl-3,5-dimethylhexyltri(3,3,3-trifluoropropoxy)silane,
methyltri(2-ethoxyethoxy)silane,
dodecyltri(2-ethoxypropoxy)silane,
myricyltri(3-cyanopropoxy)silane,
allyltri(3-carboxypropoxy)silane,
cyclohexyltri(methylacetoxy)silane,
octadecenyltrisulfatesilane,
cyclopentyltrihydrazinosilane,
methylcyclohexyltrimethoxysilane,
cyclohexenyldimethyltrimethoxysilane,
cyclo-2,4-hexadienyltriisopropoxysilane,
cyclo-1,4-pentadienyltrimethoxysilane,
xenyltrimethoxysilane,
trimethyl(4-one-2-methyl-2-pentoxy)silane,
phenylethyltripentenyloxysilane,
tetracyclobutoxysilane,
tetracyclopentoxysilane and
(ethylphenyldimethyl(dimethylamino)silane.

The various hydrolyzable silanes as defined above can be hydrolyzed alone or in combinations of two or more.

Thus it is possible to cohydrolyze two or more mono-, di- or trichlorosilanes, or even mixtures of any of them and tetrachlorosilane. Examples of these combinations are:

methyltrichlorosilane and trichlorosilane,
methyltrichlorosilane and dimethyldichlorosilane,
methyltrichlorosilane and tetrachlorosilane,
phenyltrichlorosilane and dimethyldichlorosilane,
methyltrichlorosilane and methyldichlorosilane,
vinyltrichlorosilane and methyldichlorosilane,
methyltrichlorosilane and vinyltrichlorosilane and methyldichlorosilane,
methyltrichlorosilane and phenyltrichlorosilane and dimethyldichlorosilane,
vinyltrichlorosilane and 3,3,3-trifluoropropyltrichlorosilane,
β-cyanopropyltrichlorosilane and triiodosilane,
phenyltriethoxysilane and dimethyldichlorosilane and vinyltriethoxysilane.

The proportion of any of the initial silanes in the mixture to be cohydrolyzed can vary greatly. Depending on the desired final properties, it is possible to vary the structure and the respective proportion of any of the components. For example, the presence of a silane having four hydrolyzable substituents will increase the chemical activity of the polycondensate, because of the high proportion of silanol groups developed by the latter. Likewise, the presence of trihalogenosilanes contributes great chemical activity to the polycondensate because of the SiH bonding. Vinylsilanes contribute the usual properties of polymerization and copolymerization of the

CH₂=CH— group. Phenylsilanes will augment the thermal stability of the polycondensates.

In the following by the expression silane, it is meant any compound corresponding to the definition given above, as well as a mixture of two or more of these compounds.

The process of the present invention also relates to a process wherein the hydrolysis of the silanes have started which can be either a partial or total hydrolysis and at a pre-determined moment during the course of said hydrolysis at least one silane, which has been previously solvated in a polar solvent, is introduced in such a way that there is always only a single liquid phase and the hydrolysis is continued.

This hydrolysis can be pursued until it is terminated or a solvated silane which is the same or different from that preceding can be added to the hydrolyzate while continuing the hydrolysis until it is terminated. In this manner one can proceed to a number of stages, intervening one or more grafting reactions in the course of a given hydrolysis.

The process of the present invention also relates to still another variation wherein instead of the addition of silanes as discussed above, silanes are added which are already polycondensed or copolycondensed according to the classical methods of hydrolysis or better, according to the method of the present invention are added during the course of the hydrolysis. These poly- and copolycondensates can be identical or different from the silanes in the course of hydrolysis. Examples of these polycondensates and copolycondensates are:

hexamethyldisiloxane,
bis(trimethylsiloxy)dimethylsilane,
bis(dimethylvinylsilyl)oxide,
bis(dimethylvinylsiloxy)dimethylsilane,
bis(dimethylsilyl)oxide,
bis(dimethylsiloxy)dimethylsilane,
bis(dimethylsiloxy)monoethylsilane,
tris(trimethylsiloxy)methylsilane,
tris(trimethylsiloxy)vinylsilane,
tris(dimethylvinylsiloxy)vinylsilane,
tris(dimethylsiloxy)methylsilane,
tetrakis(trimethylsiloxy)silane,
tetrakis(dimethylsiloxy)silane,
tetrakis(dimethylvinylsiloxy)silane, as well as siloxane chains having reactive groups such as hydroxyls or hydrolyzable groups. Examples of the process are the addition of hexamethyldisiloxane to tetrachlorosilane during the course of the hydrolysis or to a mixture of methyltrichlorosilane and vinyltrichlorosilane during the course of the hydrolysis.

Further, silanes and/or polycondensates and/or copolycondensates can be incorporated in a polycondensate or copolycondensate issuing from a total or partial hydrolysis or cohydrolysis achieved according to the present invention. This addition of silanes, polycondensates or copolycondensates during the course of or after the hydrolysis constitute a means of grafting the polycondensates formed, consecutively to the various successive hydrolysis in the midst of the reaction mixture.

It is remarkable that the monovalent substituted hydrocarbon radical substituent which is bonded to the silicon atom through silicon-carbon bonds of the silane can sometimes be itself reactive to the silane, or the hydrolysis agent, or even to the secondary product which is formed. This leads to more simultaneous reactions, as for example, the hydrolysis of the silane on the one hand and the formation of a new function on the other hand. Thus, for example, if the monovalent radical substituent is an acid chloride or an ester there is simultaneous hydrolysis of the hydrolyzable functions bonded to the silicon atom and of the acid chloride or the ester to form the polycondensate sought and the hydrolyzed radicals of the organic functions, that is to say, the corresponding organic acid and/or the silicic ester, according to the operating conditions.

The solvation of the silane used provides a means for avoiding direct attack by the hydrolyzing agent on the silane and thus a controlled rather than a very exothermic hydrolysis is obtained. Solvation of the silane is obtained with the aid of polar organic solvents possessing properties which cause the polar organic solvent to attach to the silicon atom of the silanes used, by physico-chemical phenomena characteristic of solvation. The polar organic solvent molecules solvated with the silicon atom are only displaced by molecules which are more polar than they are, for example, water.

The polar organic organic solvents which are particularly suitable for the solvation of the silanes in this invention are composed principally of oxygen or halogen containing organic compounds. Examples of such organic compounds are: ethers such as ethylether, butylether, tetrahydrofuran, diethylcarbitol and dioxane; ketones such as acetone, acetylacetone, methylethylketone and methylisobutylketone; halides such as chlorobenzene, carbon tetrachloride, perchloroethylene, trichloroethylene and methylene chloride; alcohols such as methanol, ethanol, propanol, butanol; alcohol ketones and alcohol aldehydes such as 4-methyl-4-ol-2-pentanone, 4,6-dimethyl-4-ol-3-isopropyl-2-heptanone, 3-ol-butanal; polyols such as ethylene glycol, propylene glycol, butylene glycol; and ether alcohols such as carbitols, cellosolves and compounds containing one or more sulfur and/or nitrogen atoms such as diethylsulfide, diethylsulfinone, pyridine and α-picoline.

These various polar organic solvents can be employed singularly or in various combinations or even in mixtures with non-polar organic solvents of the aromatic or aliphatic series which are miscible with the polar organic solvents. Examples are toluene, xylene, naphtha solvents, mineral spirits, white spirit, and hexane. By using non-polar organic solvents it is possible to regulate the polarity of the mixture for the best effect. Thus, one can use an acetone-toluene mixture which is particularly efficacious, economical and easly to employ.

In the case where one of the polar or non-polar organic solvents used in this invention displays reactivity toward the hydrolyzable substituents of the silane and particularly toward the halogen atoms, it is possible to have the water and the solvent acting on the silane simultaneously to prepare in situ, in the course of the hydrolysis, a polycondensate possessing new hydrolyzable substituents or not. The solvents best suited for the preparation of such polycondensates are most notably represented by the alcohols and polyols already mentioned in the category of solvents useful for the solvation of the silanes.

The solvation is, therefore, obtained by dissolving the silane in one of the polar organic solvents defined above in the non-limiting list. The silane is generally dissolved at a temperature bordering ambient temperature. Nevertheless, the domain of the invention is not exceeded by operating at temperatures which are lower than ambient or at higher temperatures going up to the boiling temperature of the solvent(s) used.

The quantity of the polar organic solvent required for the solvation depends on the nature of the silane and on the formation of the homogeneous liquid system. It can vary within wide limits of 0.5 to 10 moles, preferably between 2 and 5 moles of polar organic solvent per reactive function bonded to the silicon atom of the initial silane molecule to be hydrolyzed.

The quantity of the non-polar organic solvent, which can be used to obtain a better homogenization of the reaction medium, can also vary between wide limits going from 0 to molar quantities equal to those of the polar organic solvent.

The proportion of the hydrolysis agent to be used, based on the silane, varies according to the products which are to be obtained. Thus, while it is possible to operate with less than the stoichiometric amount of hydrolyzing agent, incompletely hydrolyzed products are obtained. On the other hand, an excess of hydrolyzing agent, up to as much as 5-6 times the stoichiometric quantity, leads to completely hydrolyzed and slightly condensed products. Between these two extremes there is a whole family of intermediate products which can be obtained. The amount of hydrolyzing agent is preferably from 0.1 to 2 times the stoichiometric amount.

The hydrolyzing agent can be added to the previously solvated silane. It is also possible to mix the solvated silane with a solution composed of the solvent or a mixture of solvents and the hydrolyzing agent. The silane can also be added to the solvent or the mixture of solvents previously added to the hydrolyzing agent, but in this case the solvent is in excess in relation to the hydrolyzing agent, preferably at least 2 times the amount of hydrolyzing agent, and because of the strong polarity of the medium the action of the solvent on the silane proceeds directly to the hydrolysis reaction.

The temperature at which the hydrolysis takes place affects the speed of the reaction and consequently the contact time of the reactants. It can vary between rather wide limits without, however, surpassing the ebullition temperature of the reaction medium. Preferably, one operates at temperatures which are near ambient temperature. It is obvious that one can operate at temperatures which are lower than ambient temperature, going as far as —60° C. However, the speed of the reaction diminishes with reduced temperature and reaching these low temperatures requires supplementary and onerous apparatus, and the interest in operating at such temperatures is not often justified.

After mixing the reaction products, the desired polycondensate is formed rapidly. Reaction time, easily determined for instance by measuring the electrical conductivity of the solution, is generally between 10 seconds and 10 minutes. Under the operating conditions, the product formed can evolve in the course of time but the total contact time of the reaction products is limited to less than one hour and 30 minutes, and preferably less than 15 minutes.

More advantageously, the hydrolysis is accomplished continuously which gives regular and homogeneous production and permits separation of the polycondensate as it is formed, thus avoiding evolution of the polycondensate and a loss of time. This is particularly useful in the case of grafting. In effect, the silane or silanes are added while the polycondensate is forming, solvated with the graft and hydrolyzed. While the new polycondensate is obtained, more can be added and so on. It is also possible to add another solution in which a polycondensate is just being formed.

At the end of the hydrolysis, the reaction medium contains the polycondensate formed in solution, as well as the secondary reaction products. The nature of these secondary products obviously depends on the initial hydrolyzable substituent. For example, when a halosilane is hydrolyzed the corresponding hydrogen halide is obtained. Likewise, with an alkoxysilane or an acyloxysilane, one obtains the corresponding alcohol or organic acid respectively.

At the end of the contact time for the reactants, the secondary products and the polycondensates are separated. This separation is accomplished, depending on the secondary product formed, particularly by one of the following methods which are examples of excellent separation methods.

(a) A solution of a neutralizing agent such as sodium carbonate, calcium carbonate, ammonium carbonate, ammonia, sodium, potassium, pyridine, α-picoline, or any organic base is added in the forms of a powder, a solution, an aqeuous dispersion or a liquid. This addition fosters the separation of the solution in two phases; one phase contains the secondary product and one phase contains the polycondensate sought. The neutralizing agent can be introduced at the same time as the reactants or in proportion to and as the formation of the acidity develops, permitting neutralization, in situ of all or part of the acid formed as desired. This has the advantage of ameliorating the regularity of the reaction and its control, principally in the case of very active products such as would be obtained from tetrachlorosilane or trichlorosilane.

Another method of separating the polycondensate from its solution is by (b) heating and distilling a fraction of the solution in order to disrupt the equilibrium of the solution and provoke a separation into two phases of the undistilled fraction. These two phases are then separated by decanting. The phase containing the polycondensate is practically free of any secondary product.

Separation can also be accomplished by (c) adding to the solution a quantity of water necessary to provoke separation into two phases: one phase formed of water, the secondary product and part of the solvents; and one organic phase composed of the other part of the solvents and the polycondensates.

A further example of a method for separating the polycondensate from its solution is (d) simultaneously extracting the secondary product and the polycondensate by the addition of water and a water-immiscible organic solvent such as toluene, xylene or white spirit.

Procedures (c) and (d) can be used only in the case of total hydrolysis. In effect, the addition of significant quantities of water will provoke the hydrolysis of the remaining hydrolyzable substituents, in the case of partial hydrolysis.

Where the secondary product of a total hydrolysis is an acid, the organic phase obtained in methods (b), (c) and (d) often necessitates a final neutralization effected either by washing with water, washing with the aid of a neutralizing agent, and particularly with bicarbonated water followed by washing with water, or by the addition of pure alkaline bicarbonates followed by washing with water.

In most cases the organic phase is subjected to distillation, which permits recovering the organic solvent on the one hand and the polycondensate on the other hand. When the polycondensate is particularly reactive, it is preferable to keep the organic phase in solution and eventually to concentrate it.

The process of the present invention can be put into practice continuously or discontinuously (batch) in any apparatus permitting efficacious mixture of the products employed and rapid treatment of the solution obtained after reaction. To operate discontinuously, one can utilize, for example, a reactor mounted with an agitator in which the reactants are introduced in convenient quantities, stirred for a predetermined time, and then discharged. Among continuous apparatus one can use, for example, a reactor of relatively low capacity, feeding in reaction products at constant and rigorous rate by means of gauge pumps and following a continuous system of treating the solution. Such a system has the avantage of readily allowing variations in the contact times by regulating output of the pumps and the volume of the reactor.

In the case of additions by stages, the apparatus can advantageously carry between the reactor and the treating system a second reactor mounted with a product feed for grafting, regulated with a gauge pump. If more grafts are to be carried out by stages, one can add as many reactors and feeders as there are products to graft.

The polycondensates and copolycondensates obtained from the process of this invention can be in the form of liquids, plastic solids and rigid solids which are susceptible to further reactions depending on the nature of the starting product, the hydrolysis rate, the proportion and the nature of the polycondensed or grafted products. Thus, one obtains:

Polycondensates resulting from a total hydrolysis, that is, all the hydrolyzable substituents if the starting silanes are reacted, not possessing reactive groups, are present in the form of fluids.

Polycondensates are obtained by total hydrolysis, possessing free —OH groups. Such polycondensates range from viscous liquids to plastic solids, susceptible to polymerization by means of the free —OH.

Polycondensates are obtained by total hydrolysis, possessing free —OH groups and/or ≡Si—H bonds, reactive organic groups such as ≡Si—CH=CH$_2$ and/or ≡Si—CH$_2$—CH$_2$—C≡N. These polycondensates, ranging from the liquid fluids to the hard solid, are polymerizable and reactable with other compounds.

Polycondensates, obtained by partial hydrolysis, are reactive, possess hydrolyzable groups and range from the fluid liquids to plastic solids.

Polycondensates, obtained by partial hydrolysis, possess hydrolyzable substituents and ≡Si—H bonds or reactive organic groups such as ≡Si—CH=CH$_2$ and ≡Si—CH$_2$—CH$_2$—C≡N groups.

These polycondensates range from the viscous liquids to the plastic solids, are reactive and polymerize very easily.

All of these polycondensates will keep remarkably well, they are soluble in organic solvents if the latter do not act on the reactable groups bonded to the silicon atoms. Among these organic solvents are hydrocarbons such as toluene, benzene, xylene, light essences, and white spirit; alcohols such as methanol, ethanol, isopropanol and butanol; polyols such as ethylene glycol, propylene glycol, polyethylene glycols, polypropylene glycos; the corresponding ethers and esters of the poyols such as cellosolves and carbitols; ethers such as ethylether, propylether, ethylpropylether, dioxane and tetrahydrofuran; orthoesters such as ethylorthoformate, orthocarbonates, ethylorthosilicate, ethylmethylsilicate as well as the derivative containing ≡Si—O—Si≡ bonds such as bis(trimethylsilyl)oxide, bis(trimethylsiloxy)dimethylsilane and their higher homologues; esters such as ethyl acetate, propyl acetate, 2-ethylhexylacetate and any solvents generally used in silicone chemistry.

The polycondensates of this invention are useful in making electrical insulations, laminating compounds, molding compounds, protective coatings and water repellents. The polycondensates can also be used as intermediates which react with other silicone resins, and polydiorganosiloxanes as well as organic polymers and compounds.

The following examples are illustrative only and should not be construed as limiting the invention which is properly delineated in the appended claims.

EXAMPLE 1

The following hydrolysis was carried out continuously in an apparatus consisting of two containers equipped with rotameters and connected to a reactor of 150 cc. capacity, followed by an overflow tube connected to a continuous washing system.

2,990 g. (20 mols) of methyltrichlorosilane solvated at ambient temperature with 2,320 g. (40 mols) of acetone and 4,048 g. (44 mols) of toluene was placed in one of the containers. A solution of 7,500 g. (130 mols) of acetone and 720 g. (40 mols) of water was placed in the second container.

The two solutions were simultaneously moved across the rotameters into the reactor at ambient temperature, so that both containers were completely empty at the same time after two hours which corresponded to a contact time for the reactants of 54 seconds. The reaction medium temperature was kept below 55° C. The homogeneous solution obtained after the reaction in the reactor, left the reactor via the overflow tube in a quantity equal to that of the two solutions entering the reactor and then the homogeneous solution arrived at the washing system. The solution was subjected to washing with water, which extracted the hydrochloric acid formed during the reaction and at the same time provoked the appearance of an organosilicon phase and an aqueous phase. The organosilicon phase was separated from the aqueous hydrochloric acid phase which contained a small quantity of each of the solvents by decanting.

The organosilicon phase was washed once with bicarbonated water, in order to insure neutralization and then with water. The resulting aqueous solutions were distilled and the solvents were recovered and recycled.

The organic solvents of the organosilicon phase were evaporated leaving the polycondensate behind. 1276 g. of the polycondensate was obtained, which was a yield of 95% based on the initial chlorosilane. The polycondensate was a white crystalline solid with a point of fusion of 70° C. Analysis of the solid showed that the polycondensate contained 0.13 hydroxyl group and one methyl group per silicon atom.

The resulting polycondensate was soluble in any proportion in the usual alcohols, ethers, esters, commercial halogenated solvents, mixtures of these solvents with the hydrocarbon solvents such as toluene, benzene, xylene, light essences and white spirit. The polycondensate was equally soluble in glycols, polyglycols and their corresponding ethers and esters.

The polycondensate was a time-stable product, for after many months it had the same solubilities in the same solvents.

The polycondensate was notably stable to heat. When heated in the presence of atmospheric air, it had a loss of 3 weight percent at 500° C., a 10 weight percent loss at 600° C. and a 10 weight percent loss at 1000° C.

EXAMPLE 2

The hydrolysis was carried out in an apparatus identical to that described in Example 1. A solution of 2,030 g. (35 mols) of acetone, 350 g. (3.8 mols) of toluene and 162 g. (9 mols) of water was introduced into one of the containers.

897 g. (6 mols) of methyltrichlorosilane was solvated at ambient temperature in 1740 g. (30 mols) of acetone and 350 g. (3.8 mols) of toluene. The resulting solution was introduced into the second container.

The reaction and the washing were carried out as described in Example 1. The operation lasted 30 minutes and the contact time of the reactants was 40 seconds.

The solvents were evaporated and 374 g. of a white crystalline solid were obtained which corresponded to a yield of 93% by weight based on the initial chlorosilane. The polycondensate had a point of fusion of 90° C. Analysis of the polycondensate showed that the number of hydroxyl groups per silicon atom was 0.2 and the number of methyl groups per silicon atom was one.

The solubility of this polycondensate was the same as that of the product obtained in Example 1.

The thermal stability of the polycondensate was about the same as the product of Example 1 and showed a weight loss of 4% at 500° C. and a 11% at 600° C.

EXAMPLE 3

This process was carried out in an apparatus identical to that of Example 1, but whose reactor had a 60 cc. capacity instead of 150 cc.

As described in Example 1, a solution of 748 g. (5 mols) of methyltrichlorosilane solvated in 1740 g. (30 mols) of acetone and 500 g. (5 mols) of methylisobutyl-ketone was placed in one container and a solution of 144 g. (8 mols) of water, 2,030 g. (35 mols) of acetone and 500 g. (5 mols) of methylisobutylketone was placed in the other container.

The operation lasted 30 minutes which corresponded to a contact time of the initial products of about 17 seconds.

After washing and evaporating the solvents, 340 g. of a white crystalline solid was obtained which corresponded to a yield of 95% by weight based on the initial chlorosilane. At 120° C. the solid started to fuse which was rapidly followed by hardening.

The solubilities were practically identical to those of Example 1, except that the solubility in pure hydrocarbon was slightly more difficult to obtain.

Analysis of the polycondensate showed that the resulting product possessed one methyl group per silicon atom and 0.5 hydroxyl group per silicon atom.

EXAMPLE 4

In the same apparatus described in Example 3, 810 g. (6 mols) of trichlorosilane solvated in 1740 g. (30 mols) of acetone was placed in one container and 216 g. (12 mols) of water, 2,900 g. (50 mols) of acetone and 1,000 g. (10 mols) of methylisobutylketone was placed in the other container.

The addition lasted for 30 minutes which was a contact time of 14 seconds for the reactants. The temperature of the reactor was kept near 0° C. After washing and decanting as described in Example 3, 1,250 g. of a solution whose dry extract was 24% by weight was obtained, which corresponded to a yield of 94% by weight base on the initial chlorosilane.

Analysis of the solution showed that the product possessed 0.73 hydrogen atoms per silicon atom.

The polycondensate in solution possessed exceptional reactivity due to its rich content of $\equiv$Si—H bonds, a matter which made its manipulation and its use rather delicate.

EXAMPLE 5

3.480 g. (60 mols) of acetone and 180 g. (10 mols) of water were placed in a 10 liter flask equipped with a stirrer and cooled by running water at ambient temperature.

Progressively, 807 g. (5 mols) of vinyltrichlorosilane was added so that the temperature of the reaction medium did not surpass 40° C. The addition was terminated after 30 minutes. At the end of the addition the homogeneous solution contained in the flask was emptied into a 20 liter flask equipped with a stirrer and containing 2,000 g. of toluene and 3,000 g. of water. The toluene extracted the polycondensate formed and a part of the acetone. The rest of the acetone and the hydrochloric acid formed was found in solution in the water.

The organic phase composed of toluene, acetone and the polycondensate (practically neutral) was completely neutralized by washing with bicarbonated water, and then washing with pure water. By evaporating the solvents, 385 g. of white crystalline powder was obtained which corresponded to a yield of 96% by weight based on the initial vinyltrichlorosilane.

Analysis of the polycondensate determined the elementary structure to be $(CH_2=CH-SiO_{3/2})_7O_{1/2}H$.

The polycondensate melted between 75° and 80° C. The weight loss and the solubilities are the same as those of Example 1.

EXAMPLE 6

This process was carried out as described in Example 5 with 1,740 g. (30 mols) of acetone and 180 g. (10 mols) of water to which 1,057 g. (5 mols) of phenyltrichlorosilane was added. 638 g. of a white crystalline powder was obtained which corresponded to a yield of 92.5% by weight based on the initial silane.

Analysis of the product showed that there were 0.22 hydroxyl group per silicon atom and one phenyl group per silicon atom.

EXAMPLE 7

A solution of 1,020 g. (6 mols) of tetrachlorosilane solvated in 1,740 g. (30 mols) of acetone was placed in one container and a solution of 1,000 g. (10 mols) of methylisobutylketone, 2,900 g. (50 mols) of acetone and 216 g. (12 mols) of water was placed in another container in the same apparatus of Example 3. The reactor was kept at —10° C. because the reaction was rather violent in spite of the protection given by the solvents.

In order to improve the control and the regularity of the reaction, one-quarter of the mols of the hydrochloric acid was neutralized in situ as they were formed during the reaction by the addition of sodium carbonate.

The contact time for the initial reactants was 14 seconds.

After washing and decanting as described in Example 1, 115.0 g. of a solution of 26% dry extract was obtained which corresponded to a yield of 83.5% by weight based on the initial tetrachlorosilane.

The polycondensate in solution was very rich in hydroxyl groups bonded to the silicon atoms which made it very reactive. Therefore, the usual reagents necessary for determining the hydroxyl groups would cause a polymerization which was more or less complete before the determination could be terminated merely by their presence.

EXAMPLE 8

This operation was carried out in an apparatus identical to that described in Example 1. 2,580 g. (20 mols) of dimethyldichlorosilane dissolved in 1,680 g. (29 mols) of acetone and 1,840 g. (20 mols) of toluene was placed in one of the containers and a solution of 5,200 g. (90 mols) of acetone and 540 g. (30 mols) of water was placed in the second container.

The reaction and the washing was carried out as described in Example 1. The contact time for the reactants used was 40 seconds.

The organic solution was distilled under a pressure of 20 mm. Hg. obtaining two fractions: a first fraction of 1600 g. distilling at 70° C. and composed principally of toluene, a second fraction of 700 g. distilling between 70° and 135° C. and composed of a polycondensate of cyclic structure having two methyl groups per silicon atom but no hydroxyl groups, and a residue of 423 g. of a polycondensate which was a light amber fluid having a linear chain with two methyl groups per silicon atom and 0.13 hydroxyl group per silicon atom, and having a viscosity of 26 cs. at 25° C. determined with a Ubbelohde viscosimeter.

EXAMPLE 9

The hydrolysis of a chlorosilane distillation residue was carried out in an apparatus identical to that of Example 1.

In one container a solution of 7,000 g. of acetone and 705 g. of water was placed and in the other container, 2000 g. of toluene and 3000 g. of residue containing 45% hydrolyzable chlorine was placed.

The process was carried out as in Example 1. The hydrolysis temperature was less than 40° C. and the contact time for the reactants was 50 seconds.

2000 g. of a polycondensate with a resinous aspect was obtained which had a hydroxyl group content of about 1% by weight and a content of $\equiv$SiH bonds of 2% by weight based on the polycondensate. The viscosity was about 12,000 cs. at 25° C. as determined with a Ubbelohde viscosimeter.

EXAMPLE 10

Example 1 was repeated except that the 20 mols of methyltrichlorosilane was replaced by mixtures of variable proportions of methyltrichlorosilane as shown in the table.

The resulting polycondensate were analyzed and the point of fusion was determined as shown below.

| $CH_3SiCl_3$, mols | $SiCl_4$, mols | OH in the poly- condensate per Si | $CH_3$ per Si in the poly- condensate | Point of fusion, ° C. | Appearance |
|---|---|---|---|---|---|
| 19 | 1 | 0.2 | 0.95 | 100–120 | White crystalline solid. |
| 18 | 2 | 0.25 | 0.9 | (¹) | Do. |
| 15 | 5 | 0.4 | 0.75 | (¹) | Do. |

¹ Not clear.

Examination of the results of the table showed that the number of hydroxyl groups and therefore the activity of the polycondensate was increased when the quantity of the initial tetrachlorosilane was increased.

EXAMPLE 11

Using the same process and the same apparatus of Example 1, a solution of 2690 g. (18 mols) of methyltrichlorosilane and 271 g. (2 mols) of trichlorosilane solvated in 2900 g. (50 mols) of acetone and 4048 g. (44 mols) of toluene was contacted with a solution of 8700 g. (150 mols) of acetone and 720 g. (40 mols) of water.

After washing and decanting, the solvents were evaporated from the organic phase and 1102 g. of a white crystalline solid was obtained which corresponded to a yield of 83% by weight based on the initial silanes and which contained 0.08 hydroxyl group per silicon atom and 0.095 hydrogen atom ($\equiv$Si—H) per silicon atom.

Because of the presence of the hydroxyl groups and the $\equiv$Si—H bonds, this product was especially reactive.

EXAMPLE 12

Example 11 was repeated by hydrolysis with 628 g. (4.2 mols) of methyltrichlorosilane, 244 g. (1.8 mols) of trichlorosilane in the presence of 4,465 g. (77 mols) of acetone, 1,100 g. (12 mols) of toluene and 216 g. (12 mols) of water. 296 g. of a white crystalline solid was obtained which corresponded to a yield of 77% by weight based on the initial silanes. The polycondensate had 0.144 hydroxyl group per silicon atom and 0.30 hydrogen atom ($\equiv$Si—H bonds) per silicon atom.

EXAMPLE 13

Example 1 was repeated, replacing the 20 mols of methyltrichlorosilane with a mixture of methyltrichlorosilane and dimethyldichlorosilane in variable proportions as indicated in the table below. The resulting polycondensates were analyzed and their points of fusion were determined. The results were gathered in the table below and for comparison the same characteristics for the methyltrichlorosilane polycondensate prepared alone under the same conditions have been indicated.

| $CH_3SiCl_3$, mols | $(CH_3)_2SiCl_2$, mols | OH per Si in the poly- condensate | Point of fusion of the poly- condensate, ° C. | Properties |
|---|---|---|---|---|
| 20 | 0 | 0.13 | 70 | Crystalline solid. |
| 19.4 | 0.6 | 0.13 | 60–90 | Do. |
| 19 | 1 | 0.07 | 45–60 | Slightly opaque solid. |
| 18.6 | 1.4 | 0.075 | 15–20 | Viscous liquid at 25° C., viscosity ca. 50,000 cs. |
| 18 | 2 | 0.11 | 15–20 | Do. |
| 17 | 3 | 0.15 | 60–90 | Slightly opaque solid. |

Upon examining the table it was noted that the number of hydroxyl groups per silicon atom diminished then increased when the proportion of dimethyldichlorosilane was increased in the initial mixture. The same phenomenon was noticeable for the point of fusion of the resulting polycondensate.

EXAMPLE 14

The same apparatus of Example 3 was used except the overflow tube entered a second reactor equipped with a connector attached to a container by means of a rotameter and an overflow tube which entered a third reactor identical to the second, whose overflow tube was connected to a continuous washing system.

5,380 (36 mols) of methyltrichlorosilane and 646 g. (4 mols) of vinyltrichlorosilane were solvated in a mixture of 5,800 g. (100 mols) of acetone and 8,200 g. (89 mols) of toluene. The resulting solution was introduced into a container of the first reactor. The other container contained 17,400 g. (300 mols) of acetone and 1,440 g. (80 mols) of water.

The container of the second reactor contained 460 g. (4 mols) of monomethyldichlorosilane dissolved in 2,535 g. (44 mols) of acetone and the container of the third reactor contained 3,894 g. (24 mols) of hexamethyldisiloxane. The first two solutions were introduced into the first reactor at the same time. When this mixture reached the second reactor, the addition of the monomethyldichlorosilane was started, then at the entry of the third reactor, the addition of the hexamethyldisiloxane was started. The entry of each solution was regulated so that there was a contact time of 45 seconds in the first reactor, 30 seconds in the second reactor and 30 seconds in the third reactor. The solution entering the washing system was treated continuously as in Example 1.

The final organosilicon solution was evaporated by heating at 250° C. where it was kept for one hour.

The residue was composed of 3,472 g. of an oil with a density of 1.145 g./cc. and a viscosity of about 10,000 cs. at 25° C. which corresponded to a yield of 97% by weight based on the original reactants.

Analysis of the polycondensate showed 0.008 hydroxyl group per silicon atom, 0.06 hydrogen atom ($\equiv$Si—H bond) per silicon atom and 0.08 vinyl group per silicon atom.

3.7 moles of the 24 initial moles of the hexamethyldisiloxane were grafted onto polycondensate. The rest of the hexamethyldisiloxane was recovered from the evaporation process.

EXAMPLE 15

The same apparatus as that described in Example 14, but having only two reactions, was used.

680 g. (4 mols) of tetrachlorosilane solvated in 4,000 g. (69 mols) of acetone was placed in one of the containers. The other container of the first reactor contained 216 g. (12 mols) of water and 986 g. (17 mols) of acetone.

The container of the second reactor contained 2,916 g. (18 mols) of hexamethyldisiloxane.

The first two solutions were added into the first reactor at the same time. When the mixture entered the second reactor, the addition of the hexamethyldisiloxane was begun. The entry of each of these solutions was regulated so that there was a contact time of 60 seconds in the first reactor and of 2 minutes in the second reactor.

The solution was then washed continuously and neutralized as described in Example 1. A part of the solvent was evaporated and 320 g. of a solution with 75% dry extract was obtained having a viscosity of 7 cs. at 25° C. Analysis of the polycondensate showed 0.01 hydroxyl group per silicon atom.

EXAMPLE 16

The process was carried out as described in Example 3 with 290 g. (5 mols) of acetone, 416 g. (13 mols) of methanol and 108 g. (6 mols) of water placed in one container and 290 g. (5 mols) of acetone, 736 g. (8 mols) of toluene and 1,000 g. of chlorosilane distillation residue containing 45% hydrolyzable chlorine placed in the other container. After washing continuously the final solution was evaporated and 982 g. of an oil was obtained which had a viscosity of 30 cs. at 25° C. and contained 30% $\equiv$Si—OCH$_3$ groups.

EXAMPLE 17

A mixture of 2,410 g. (50 mols) of 95% ethyl alcohol and 486 g. (27 mols) of water are added over a period of one hour to a solution of 4,200 g. (28 mols) of methyltrichlorosilane solvated by means of 1,625 g. (28 mols) of acetone kept at 1° C. in a 20 l. flask equipped with a stirrer.

When the addition was terminated a homogeneous solution was obtained. A part of the solvent was distilled and two distinct phases were then formed which were allowed to decant. The lower phase which contained an oily product was separated. The acid number of the solution was 30. The neutralization was terminated with sodium bicarbonate and the product was then filtered.

After the solvent was evaporated 2000 g. of a colorless oil with a viscosity of 40 cs. at 25° C. was obtained, which corresponded to a yield of 83.5% by weight based on the original silane.

Analysis of this oil showed the presence of one ethoxy group per 2 silicon atoms and one methyl group per silicon atom.

EXAMPLE 18

A solution of 1,492 g. of 95% ethyl alcohol and 38 g. of water and a solution of 1,794 g. (12 mols) of methyltrichlorosilane solvated in 696 g. (12 mols) of acetone were simultaneously placed in a 5 liter flask equipped with an agitator. The temperature of the reaction medium was kept at 10° C. It was heated and a part of the solvent was distilled and two phases were thus obtained.

As in Example 17, 1,000 g. of an oil was obtained which corresponded to a yield of 82.5% by weight based on the original silane. The oil had a viscosity of 10 cs. at 25° C. and contained 3 ethoxy groups per 4 silicon atoms and one methyl group per silicon atom.

EXAMPLE 19

This process was carried out as described in Example 1 with a solution of 1,730 g. (10 mols) of methyldichloroacetoxysilane solvated in 1,160 g. (20 mols) of acetone and 2,024 g. (22 mols) of toluene in one container and a solution of 4,350 g. (75 mols) of acetone and 540 g. (30 mols) of water in the other container.

637 g. of a white crystalline solid was obtained identical to the polycondensate obtained in Example 1, which corresponded to a yield of 95% by weight based on the initial silane.

EXAMPLE 20

This process was carried out as described in Example 3 with a solution of 1,100 g. (5 mols) of methyltriacetoxysilane solvated in 1,740 g. (30 mols) of acetone and 460 g. (5 mols) of toluene in one container and a solution of 144 g. (8 mols) of water, 2,030 g. (35 mols) of acetone and 460 g. (5 mols) of toluene in the other container.

315 g. of a white crystalline solid was obtained which corresponded to a yield of 90% by weight based on the initial silane. Analysis of the polycondensate showed that the product contained one methyl group per silicon atom and 0.05 acetoxy group per silicon atom.

EXAMPLE 21

When 20 moles of any one of the following silanes or silane mixtures are substituted for the methyltrichlorosilane of Example 1 and the same process is followed, equivalent results are obtained.

A mixture of
    1 mol of trimethylchlorosilane and
    19 mols of vinyltrichlorosilane,
Octadecyltrichlorosilane,
3,3,3-trifluoropropyltrichlorosilane.
A mixture of
    2 mols bis (acetoxyethyl)phenylchlorosilane and
    18 mols of methyltriacetoxysilane.
A mixture of
    6 mols of monomethyldichlorosilane and
    14 mols of dimethyldichlorosilane.
A mixture of
    3 mols of tertiarybutylethyldichlorosilane and
    17 mols of phenyldiethoxychlorosilane.
A mixture of
    10 mols of phenylmethyldiacetoxysilane and
    10 mols of benzyltrichlorosilane.
A mixture of
    1 mol of trimethylaminosilane,
    1 mol of dimethylphenylchlorosilane and
    18 mols of 2-ethylhexyldibromosilane.
A mixture of
    3 mols of phenylmethylvinylchlorosilane and
    17 mols of beta-cyanopropyltrichlorosilane.
A mixture of
    1 mol of phenylmethylmonochlorosilane and
    19 mols of tolyltriallyloxysilane,
Omega-cyanooctadecenyltriphenoxysilane,
Methyltri(2-ethoxyethoxy)silane,
Octadecenyltrisulfate silane,
Cyclo-1,4-pentadienyltrimethoxysilane.
A mixture of
    5 mols of ethylphenyldimethyl(dimethylamino)silane and
    15 mols of tetracyclobutoxysilane,
Cyclopentyltrihydrazinosilane and A mixture of
- 3 mols of trichlorosilane,
- 6 mols of tertiarybutyltrichlorosilane,
- 1 mol of 2-ethylhexyltribromosilane,
- 5 mols of decenyltriiodosilane and
- 5 mols of cyclopentenyldiethoxychlorosilane.

EXAMPLE 22

When Example 1 is followed except that 20 mols of dodecyltri(2-ethoxypropoxy)silane are substituted in place of the methyltrichlorosilane and the contact time is 90 minutes, equivalent results are obtained.

EXAMPLE 23

When Example 19 is followed except that 10 mols of (methylsulfonyl)ethyltri-(2-butenyloxy)silane is substituted in place of the methyldichloroacetoxysilane, 90 mols of water is used and the contact time is 10 minutes, equivalent results were obtained.

That which is claimed is:

1. A process for preparing organosiloxanes comprising
   (A) dissolving in a polar organic solvent at least one silane having at least one hydrolyzable substituent bonded to the silicon atom and any remaining substituents being selected from the group consisting of hydrogen atoms and monovalent organic substituents bonded to the silicon atom through silicon-carbon bonds,
   (B) hydrolyzing continuously by contacting the silane with a hydrolyzing agent in a single homogeneous liquid phase, continuously feeding the silane and the hydrolyzing agent into a reactor from which a polycondensate solution is continuously withdrawn,
   (C) maintaining a single homogeneous liquid phase during (A) and (B), and
   (D) separating a polycondensate formed in (B) from at least any remaining hydrolyzing agent.

2. The process according to claim 1 wherein the polycondensate formed in (B) is separated from any remaining hydrolyzing agent and any by-products produced during the hydrolysis.

3. The process according to claim 1 wherein the polycondensate formed in (B) is separated from its solution.

4. The process according to claim 1 wherein the hydrolyzing agent is water.

5. The process according to claim 1 wherein at least one silicon compound selected from the group consisting of a silane as defined in claim 1 and a partially condensed hydrolyzate of at least one of the silanes is added after the hydrolysis of step (B) is terminated.

6. The process according to claim 1 wherein a contact time between the silane and hydrolyzing agent in step (B) is from 10 seconds to 10 minutes.

7. The process according to claim 1 wherein a predetermined amount of the solution formed in (A) is continuously hydrolyzed by contacting with a predetermined amount of the hydrolyzing agent in a reactor from which a polycondensate solution is continuously withdrawn and separated.

8. The process according to claim 7 wherein the solution, after the polycondensate is removed, is distilled, the polar organic solvent recovered and returned to step (A).

9. The process according to claim 7 wherein a contact time between the silane and the hydrolyzing agent in step (B) is from 10 seconds to 10 minutes.

10. The process according to claim 7 wherein the polycondensate solution is continuously withdrawn into at least a second reactor in series where it is contacted by continuous addition of at least one silicon compound selected from the group consisting of a silane having at least one hydrolyzable substituent bonded to the silicon atom any remaining substituents being selected from the group consisting of hydrogen atoms and monovalent organic substituents bonded to the silicon atom through silicon-carbon bonds and a partial condensate of at least one of the silanes.

11. The process according to claim 1, wherein the silane is selected from the group consisting of methyltrichlorosilane, trichlorosilane, vinyltrichlorosilane, phenyltrichlorosilane, tetrachlorosilane, dimethyldichlorosilane, methyldichlorosilane, distillation residues of the chlorosilanes, methyldichloroacteoxysilane and methyltriacetoxysilane.

12. The process according to claim 1, wherein the silane is methyltrichlorosilane.

13. The process according to claim 1, wherein the polar organic solvent is selected from the group consisting of ethers, ketones, halides, alcohols, alcohol-ketones, alcohol-aldehydes, polyols, ether-alcohols and organic solvents containing at least one sulfur or nitrogen atom.

14. The process according to claim 13 wherein the polar organic solvents are mixed with non-polar organic solvents selected from a group consisting of aliphatic hydrocarbon solvents and aromatic hydrocarbon solvents, all being miscible with the polar organic solvents.

15. The process according to claim 13 wherein the polar organic solvent is present in an amount of from 0.5 to 10 moles per mole of hydrolyzable substituent of the silane.

16. The process according to claim 15 wherein the polar organic solvent is present in an amount of from 2 to 5 moles per mole of hydrolyzable substituent of the silane.

17. The process according to claim 14 wherein the amount of non-polar organic solvent ranges up to an amount equal to the amount of polar organic solvent present.

18. The process according to claim 1 wherein less than stoichiometric amounts of hydrolyzing agent is used whereby a partially hydrolyzed polycondensate is obtained.

19. The process according to claim 1 wherein the amount of hydrolyzing agent used ranges from 5 to 6 times the stoichiometric amount.

20. The process according to claim 1 wherein the temperature of the hydrolyzing is from −60° C. to the boiling temperature of the reaction medium.

21. The process according to claim 20 wherein the temperature during step (A) is ambient.

References Cited

UNITED STATES PATENTS

| | | |
|---|---|---|
| 2,483,158 | 9/1949 | Sprung. |
| 2,486,162 | 10/1949 | Hyde. |
| 2,758,124 | 8/1956 | Schwenker. |
| 2,832,794 | 4/1958 | Gordon. |
| 2,901,460 | 8/1959 | Boldebuck. |

DELBERT E. GANTZ, Primary Examiner

P. F. SHAVER, Assistant Examiner

U.S. Cl. X.R.

117—13; 260—46.5